United States Patent
Ye et al.

(10) Patent No.: US 7,472,375 B2
(45) Date of Patent: Dec. 30, 2008

(54) CREATING MANAGED CODE FROM NATIVE CODE

(75) Inventors: Jinyun Ye, Shanghai (CN); Zhikai Song, Shanghai (CN); Gururaj Nagendra, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 688 days.

(21) Appl. No.: 11/092,355

(22) Filed: Mar. 29, 2005

(65) Prior Publication Data

US 2006/0225033 A1  Oct. 5, 2006

(51) Int. Cl.
*G06F 9/44* (2006.01)
*G06F 9/45* (2006.01)

(52) U.S. Cl. .................. 717/106; 717/140; 717/152

(58) Field of Classification Search .......... 717/100–178
See application file for complete search history.

(56) References Cited

U.S. PATENT DOCUMENTS

| | | | | |
|---|---|---|---|---|
| 6,598,141 | B1* | 7/2003 | Dussud et al. | 707/206 |
| 7,017,162 | B2* | 3/2006 | Smith et al. | 719/328 |
| 7,032,216 | B1* | 4/2006 | Nizhegorodov | 717/152 |
| 2002/0129092 | A1* | 9/2002 | Tolson et al. | 709/202 |
| 2005/0188382 | A1* | 8/2005 | Nagendra et al. | 719/328 |
| 2005/0198618 | A1* | 9/2005 | Lalonde et al. | 717/110 |
| 2005/0246677 | A1* | 11/2005 | Mountain et al. | 717/100 |

OTHER PUBLICATIONS

"Intel Technology Journal", vol. 7, Issue 1, Feb. 19, 2003, ISSN 1535-766X, pp. 1-83, http://www.intel.com/technology/itj/2003/volume07issue01/vol7iss1_managed_runtime_technologies.pdf.*

Jon Box, Dan Fox. "An Introduction to P/Invoke and Marshaling on the Microsoft .NET Compact Framework" http://msdn.microsoft.com/library/default.asp?url=/library/en-us/dnnetcomp/html/netcfintrointerp.asp. Mar. 2003.

"What is Intel® IPP?" http://www.intel.com/software/products/ipp/IDF_IPP_What_is_IPP.pdf. Aug. 24, 2001.

.NET Framework Developer's Guide—Assemblies Overview. http://msdn.microsoft.com/library/default.asp?url=/library/en-us/cpguide/html/cpconassembliesoverview.asp. Accessed Feb. 14, 2005.

Intel® Integrated Performance Primitives (IPP)—Intel® Architectrue (IA) and Intel® StrongArm* Microarchitecture (Intel SA) http://www.intel.com/software/products/ipp/IDF_IPP_IA_and_SA.pdf. Aug. 24, 2001.

(Continued)

*Primary Examiner*—Wei Y Zhen
*Assistant Examiner*—Chih-Ching Chow
(74) *Attorney, Agent, or Firm*—Trop, Pruner & Hu, P.C.

(57) ABSTRACT

In one embodiment, the present invention includes a method for generating an assembly that is usable in a managed environment. More specifically, the assembly may be an all-inclusive object file that contains a native code module, a managed wrapper and prototype information in a single assembly. The method may include forming an object file from a native code module, where the object file includes prototype information, generating a managed code wrapper using the prototype information, and creating a single assembly including the managed code wrapper and the native code module. In some embodiments, the managed code wrapper may be automatically created, reducing burden on a developer. Other embodiments are described and claimed.

20 Claims, 4 Drawing Sheets

OTHER PUBLICATIONS

"Creating C# Wrappers for Intel Integrated Performance Primitives Using Microsoft.NET* Inoperability Mechanisms" Version 1.0. http://www.intel.com/software/products/ipp/techtopics/interop.pdf. Copyright 2003.

Gregory, Kate. "Head Spinning Continued: The Managed Wrapper". From Kate Gregory's Codeguru Column, "Using Visual C++ .NET". http://www.developer.com/net/cplus/print.php/3085331. Sep. 20, 2003.

Gregory, Kate. "Head-Spinning Interoperability between Managed and Native C++". From Kate Gregory's Codeguru Column, "Using Visual C++ .NET". http://www.developer.com/net/cplus/print.php/2238651. Jul. 22, 2003.

Gregory, Kate. "Head-Spinning Continued: P/Invoke". From Kate Gregory's Codeguru Column, "Using Visual C++ .NET". http://www.codeguru.com/columns/Kate/print.php/c4857/. Aug. 26, 2003.

Gregory, Kate. "Head-Spinning Continued: Who Needs P/Invoke?". From Kate Gregory's Codeguru Column, "Using Visual C++ .NET". http://www.codeguru.com/columns/Kate/print.php/c4859/. Aug. 29, 2003.

* cited by examiner

CREATING MANAGED CODE FROM NATIVE CODE

BACKGROUND

The present invention relates to software used in computer systems, and more particularly to software used in a managed runtime environment.

Certain modern programming languages execute in a managed runtime environment (MRTE) and provide automatic memory management and dynamic loading facilities, among other features. MRTEs dynamically load and execute code that is delivered in a portable format. Thus, the code must be converted into native instructions via interpretation or compilation.

Managed code is thus an image created when source code is compiled using a managed environment-compliant compiler, such as a Microsoft .NET framework-compliant compiler or a JAVA™-compliant compiler. Managed code can be a managed assembly that either can be a dynamically linked library (DLL) or a portable executable (PE) file. The managed DLL or PE file includes an intermediate language representation, such as Microsoft intermediate language (MSIL) code or JAVA™ bytecodes, and metadata. Metadata is information used by a common language runtime (CLR) to handle security and memory operations.

In contrast, unmanaged code is an image created when source code is compiled using a native compiler to create a native binary for underlying platform hardware, e.g., a processor. In contrast to managed code, the unmanaged code can be optimized for a given processor, allowing greater performance than managed code, which is typically abstracted away from hardware specifics.

Significant amounts of legacy code exist. Generally, this code is unmanaged code written in different unmanaged languages, such as C, C++ or the like. To use this legacy code in a managed environment, a developer has to take the legacy libraries and hand code managed-to-native interoperability code to allow the native code to be used in a managed environment. Alternately, a developer is forced to design complex tools to allow use of native code in a managed environment.

The complexity includes additional development efforts required to describe the native routine interface, leaving a significant burden to a developer. In addition, a developer must create an additional managed code program (e.g., a C# program) to describe the prototype of the methods in the native libraries. The extra managed code program must then be compiled by a managed code compiler to generate a managed interface, and the legacy libraries must be compiled by a native compiler to generate native compiled code. Accordingly, two DLLs exist. Furthermore, interoperability code, such as a platform invoke mechanism, is required to link these two DLLs.

Accordingly, a need exists to reduce the complexity of using native code in a managed environment.

DETAILED DESCRIPTION

Figure 1:
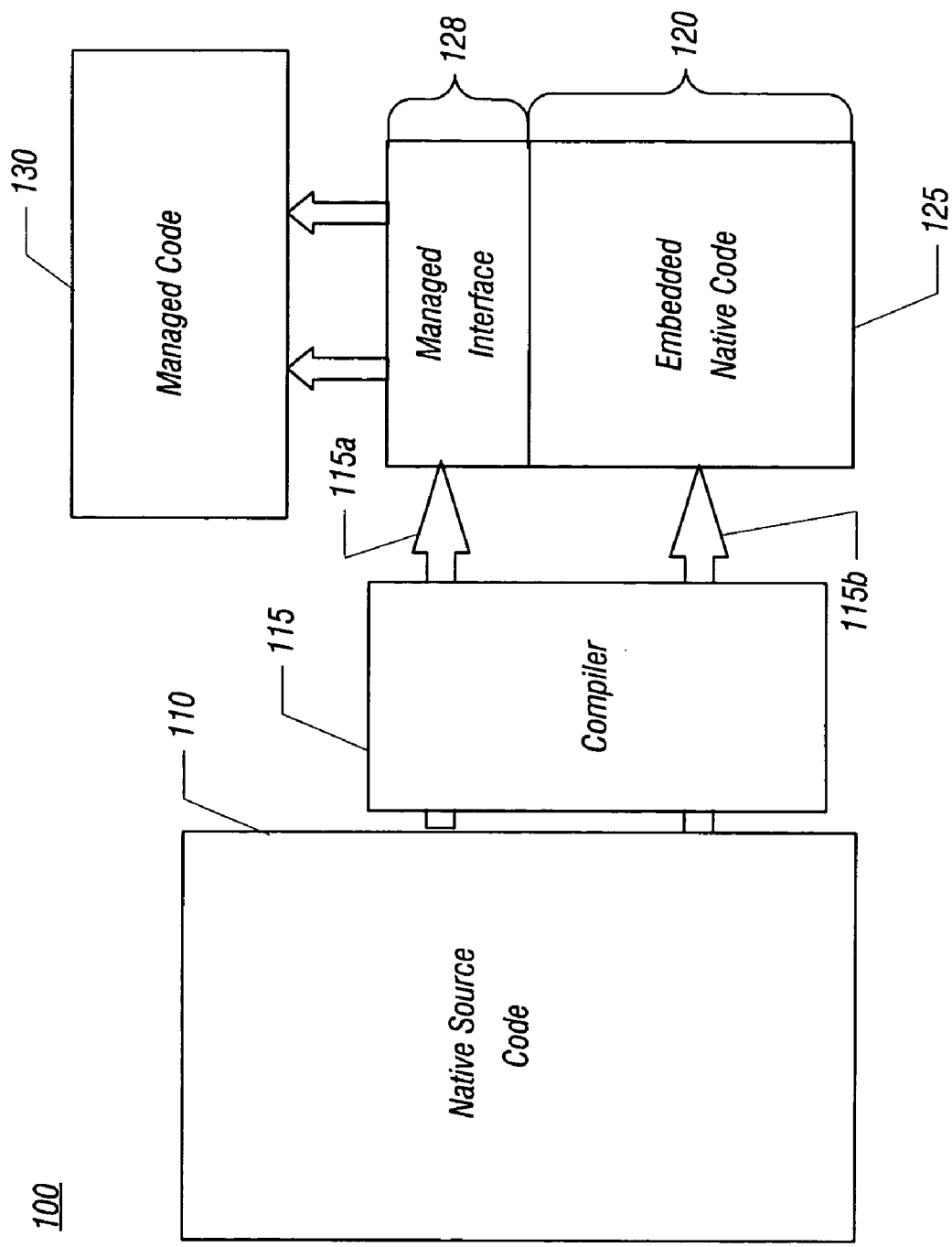
FIG. 1 is a block diagram of a software model in accordance with one embodiment of the present invention.

Referring now to FIG. 1, shown is a block diagram of a software model in accordance with one embodiment of the present invention. As shown in FIG. 1, software model 100 may be used to obtain and use unmanaged code in a managed code environment. While the managed environment may vary, in some embodiments, the managed environment may be a managed run time environment (MRTE), such as a Microsoft .NET (hereafter .NET) framework or a JAVA™ environment. As shown in FIG. 1, software model 100 includes unmanaged or native source code in a library 110. The native source code may include legacy code, such as code written in various unmanaged languages such as C, C++, or FORTRAN, although the scope of the present invention is not so limited. As an example, the native source code may be legacy native libraries that are optimized for a particular processor or other platform hardware. As an example, in one embodiment, the libraries may include Integrated Performance Primitives (IPP), available from Intel Corporation, Santa Clara, Calif. These primitives may be a cross-platform software library that provides various library functions for multimedia, audio, video, image processing, compression, computer vision and the like. The functions within the IPP may be used to optimize performance, speeding applications on a target platform.

To use this source code in a managed environment without the added development time, expense and hand coding of managed-to-native interoperability code, a compiler in accordance with an embodiment of the present invention may be used. Specifically, as shown in FIG. 1, a compiler 115 may compile desired unmanaged source code in library 110 into native object code (shown via arrow 115b from compiler 115). Furthermore, compiler 115 may provide a managed interface between the native object code and a managed environment (shown via arrow 115a from compiler 115). That is, a single compiler may be used to both compile native code and to create a managed wrapper for the native code. Thus as shown in the embodiment of FIG. 1, compiler 115 generates a single assembly 125, which may be, for example, a .NET assembly. An assembly is a building block of certain managed environments. An assembly is a collection of types and resources that work together and form a logical functional unit. This single assembly includes both embedded native code 120 and a managed interface 128.

Thus, native source programs from library 110 can be directly built into a managed assembly. Specifically, assembly 125 includes methods implemented in native code, in addition to intermediate language code, such as MSIL code or JAVA™ bytecodes, and metadata to describe the interface of the native methods. Accordingly, a user does not need to create any interoperability code, such as wrapper code to export native code into a managed code environment. Thus in various embodiments, embedded native code 120 may remain in its native code format, e.g., C or C++, and managed interface 128 may be written in a managed language, e.g., C# or managed C++.

Managed code 130 may be a user program written for execution in a MRTE, such as .NET code or JAVA™ code. Via managed interface 128 of assembly 125, managed code 130 can access the functionality in embedded native code 120. Thus legacy code having desired functionality can be readily imported into a managed assembly and be effectively used by managed code to provide desired functionality. In such manner, a user may load only a single compiled binary, such as a DLL for a WINDOWS™ environment, to take advantage of native libraries. Furthermore, the user need not know that the native code is in the same DLL as the managed wrapper code, as the wrapper code has already been created for the user. Accordingly, a user need not go through the time and expense of manually developing wrapper code to import legacy libraries into a managed environment.

While the native code may take many different forms, in some embodiments the native code may include a library of functions including, for example audio, video, and other image and signal processing techniques that are optimized for given hardware. Accordingly, managed code 130 may take advantage of the native code to more effectively perform different processing activities on a given platform. As a result, managed interface 128 may be compiled to most efficiently perform desired functions on a target platform.

Figure 2:
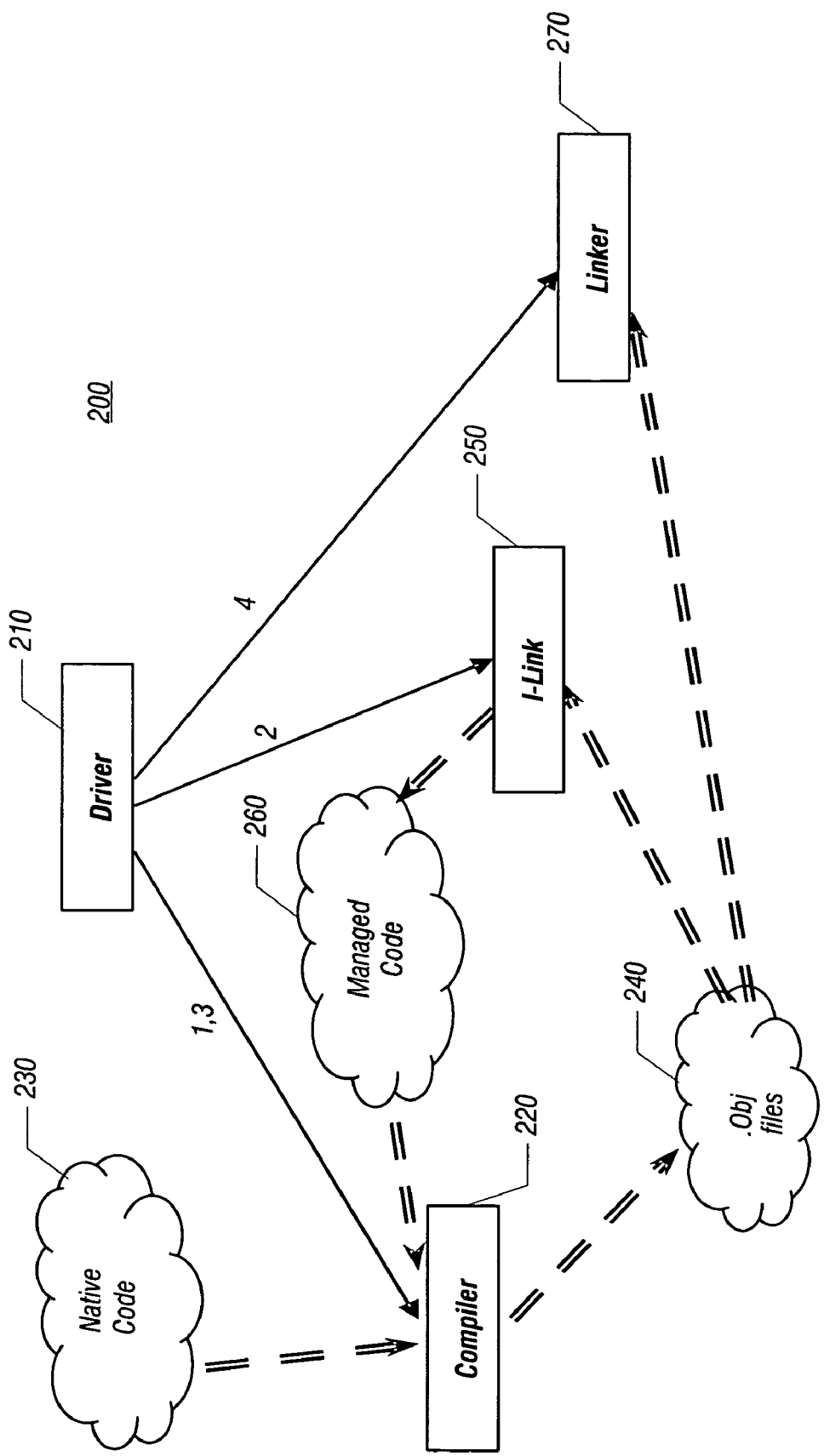
FIG. 2 is a block diagram of a framework in accordance with an embodiment of the present invention.

Referring now to FIG. 2, shown is a block diagram of a framework in accordance with an embodiment of the present invention. As shown in FIG. 2, framework 200 includes various components to form a single managed assembly including both native unmanaged code and a managed interface. A driver 210, which may be an overall control module to invoke other modules in a desired sequence and further to invoke corresponding parameters, may initiate the flow shown in framework 200. In some embodiments, driver 210 may perform like the main function of a C program. As shown by the reference numerals on the solid lines in FIG. 2, in one embodiment driver 210 first may invoke a compiler 220 to compile native code 230. In various embodiments, native code 230 may be source files written in an unmanaged language. Compiler 220 may read a native code source file as an input and parse the source file accordingly. Furthermore, compiler 220 may optimize an intermediate representation of the code and generate target code (e.g., object code). Furthermore, compiler 220 may record prototype information in metadata associated with the native source file. Still further, compiler 220 may provide the generated code and data structures (including the metadata) into an object file (i.e., one or more .Obj files) as an output. Thus as shown in FIG. 2, compiler 220 may output object files 240. To develop a single assembly that may include multiple legacy files, driver 210 may cause compiler 220 to compile each of the native code files iteratively, before moving to other processing activities in development of the managed assembly.

Still referring to FIG. 2, after compiler 220 generates object files 240, driver 210 may cause a linking tool (I-Link) 250 to be activated. Linking tool 250 may parse the object files described above and extract the prototype information created above. Specifically, linking tool 250 may extract prototype information from metadata inside the object files. In such manner, the metadata may be used by linking tool 250 to collect prototype information from the object files and generate wrap code for the native routines. In various embodiments, the wrap code may be used to pass parameters from managed code to native methods and map return values back to the managed code upon completion of the native methods, during execution. In some embodiments the prototype information may be recorded in MSIL metadata, although the scope of the present invention is not so limited. This metadata may be stored in a separate section of the object files generated, in some embodiments. Thus as shown in FIG. 2, object files 240 may be provided to linking tool 250. In turn, linking tool 250 generates managed code 260 which may be, in one embodiment, managed C++ code, although the scope of the present invention is not so limited.

Managed code 260 then may be provided to compiler 220, under control of driver 210. Compiler 220 may compile managed code 260 and generate additional object files 240 for this managed code. Finally, driver 210 may invoke a linker tool 270 to link all object files 240 together to create a single assembly DLL, inside of which is a native implementation of the desired methods in native code 230, along with intermediate language code and metadata to export these methods. While described herein as a DLL, it is to be understood that the scope of the present invention is not so limited, and a single compiled binary of any environment may be generated. In one embodiment, linker 270 may be a linking tool to process object files with metadata information.

Figure 3:
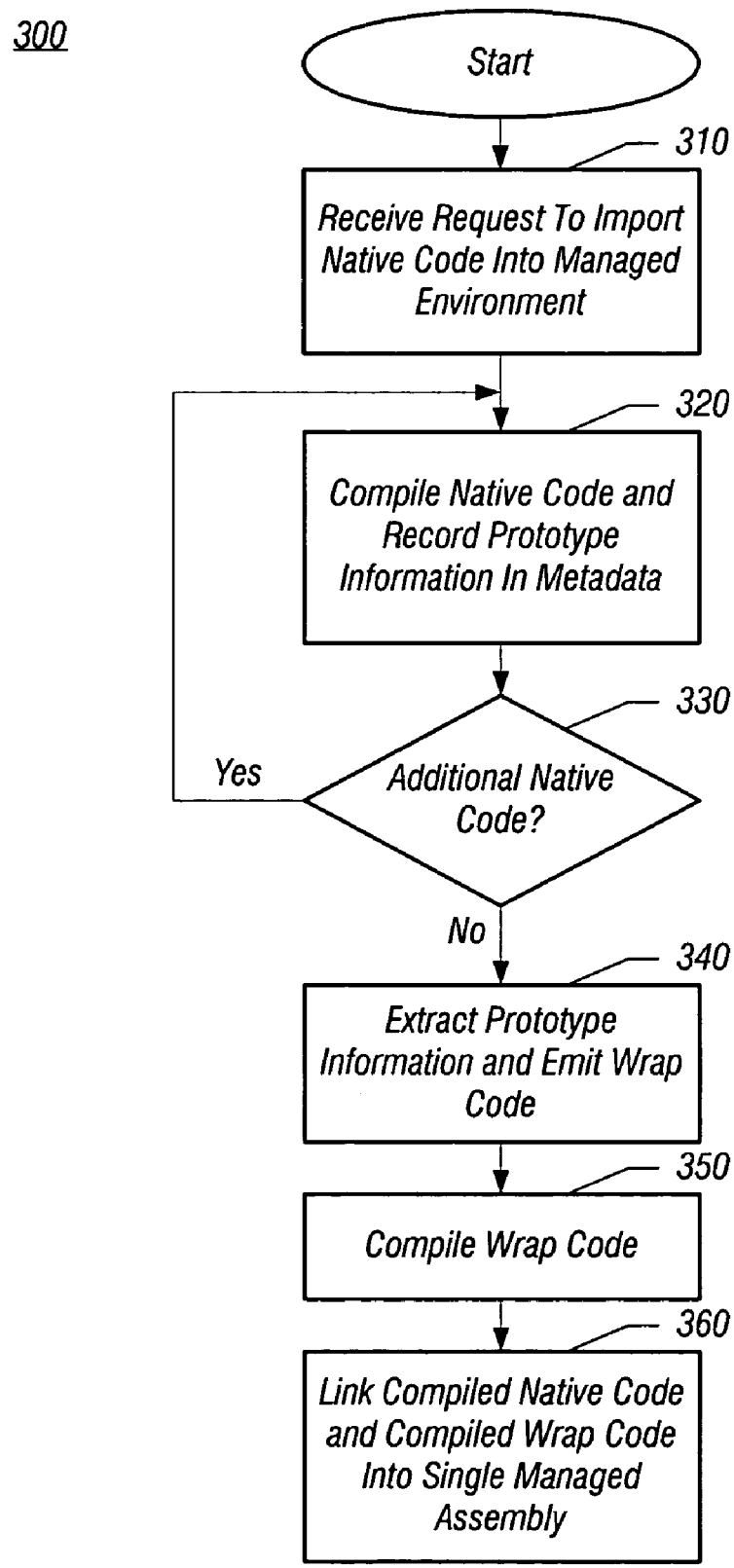
FIG. 3 is a flow diagram of a method in accordance with one embodiment of the present invention.

Referring now to FIG. 3, shown is a flow diagram of a method in accordance with one embodiment of the present invention. As shown in FIG. 3, method 300 may be used to take native code and form a managed code assembly using the native code. Method 300 begins by receiving a request to import native code into a managed environment (block 310). For example, legacy code which performs a desired application may exist in a legacy library. The request may come from a user (e.g., a developer) desiring the features of the legacy application in a managed code space. In some embodiments, the request may initiate a code sequence, for example, a driver program to cause various compiler and linking tools to obtain and process the legacy code into a form usable in a managed code environment.

Still referring to FIG. 3, next the native code may be compiled and prototype information regarding the native code may be recorded in metadata associated with the native code (block 320). As an example, a compiler may take native code source files and output object files. These object files may include or may be associated with additional object files that include metadata corresponding to the native code. Specifically, the metadata may include prototype information that will be later used in forming the managed code assembly. Next, it may be determined whether additional native code exists that is desired to be placed into a managed code environment (diamond 330). If so, control returns to block 320.

If instead the collection of code to be placed into a managed environment is complete, control passes to block 340. There, the prototype information associated with the native code may be extracted and wrap code may be generated using the prototype information (block 340). The wrap code may be used to pass parameter information between the managed runtime environment and the native code during execution. When the wrap code has been generated, next it may be compiled (block 350). The wrap code may be managed code, in one embodiment, and the compilation of the wrap code may generate additional object files. Finally, the compiled native code and the compiled wrap code may be linked into a single managed assembly (block 360). In such manner, a single DLL may be generated that includes both compiled native code containing the desired function(s) to be executed and compiled wrap code to provide an interface between the native code and the managed runtime environment in which the assembly is to be executed.

In such manner, developers can easily adopt native code for use in managed environments. As an example, libraries of native code exist that are optimized for a particular processor. Typically, to use such optimized libraries in a managed code environment, a developer needs to create a managed-to-native interoperability wrapper, which involves a steep learning curve and testing overheads. In contrast, embodiments of the present invention may allow a developer to directly adopt native code libraries for a managed environment.

In other words, a managed interface may be automatically generated. Accordingly, a developer may avoid hand coding of managed-to-native interoperability code or design of additional tools to generate such code. As a result, a gap between a managed environment and native code may be bridged. That is, managed environments abstract away underlying hardware. By directly adopting native code for use in a managed environment, the gap between managed code and native code may be bridged. This allows selection and use of libraries optimized for a given processor in a managed code space. By using native code directly in a managed environment, more efficient use of processor resources and features may be effected.

Embodiments of the present invention may efficiently create managed bindings for a targeted managed environment in a single binary file. The single assembly thus generated is a combined library that may be reused both by managed code and native code. That is, the single assembly is a managed assembly that can be reused in managed code environments, for example, C#, managed C++, and JAVA™ managed environments. Still further, the managed assembly includes a library (.LIB) file generated during operation. Native code may include a header file to use the .LIB file during compilation and execution.

An example implementation of method 300 will now be discussed. While shown herein with specific code and features, it is to be understood that the scope of the present invention is not so limited and that other embodiments may take various forms.

Referring now to Table 1, shown is an example native code function entitled "bar."

TABLE 1 int bar ( double p1, int p2 ) { . . . }

As shown in Table 1, the native code function is in the C language.

In the example implementation, a compiler in accordance with an embodiment of the present invention may generate metadata including prototype information of the native code, in addition to compiling the native code function into a compiled object file. In the example implementation, the native code function may have the metadata information set forth in Table 2, below:

TABLE 2

.method public static int32
modopt ( [mscorlib] System.Runtime.CompilerServices.CallConvCdecl)
    bar (float64 A_0, int32 A_1)

As described above, this metadata may be stored in a separate section of the compiled object file for the code function. The metadata shown in Table 2 thus describes the functions and parameters to be used during execution.

Next, a linking tool may extract and collect all prototype information from all object files compiled. In this way, the linking tool may determine the prototype of all routines to be executed. Based on the extracted prototype information, managed code may be emitted according to the prototype for all external routines.

Referring now to Table 3, shown is exemplary pseudo-code for generating a managed code interface from prototype information.

TABLE 3

For each object file do
    For each external routine in the object file do
        Extract prototype information from the metadata in the object file TABLE 3-continued Done
Done
Emit managed (e.g., managed C++) code according to the prototype information Thus to generate a managed code interface, prototype information is extracted from the metadata in a corresponding object file, and managed code is emitted according to the prototype information. While the managed code generated according to the pseudo-code of Table 3 may take different forms, the managed code generated in one embodiment is set forth in Table 4 below.

TABLE 4 class class_name {
public:
    static int bar (double p1, int p2) {
        return ::bar (p1,p2) ; // This will invoke the native code function bar set forth in Table 1
    }
}

In some embodiments the class name of the managed code may be specified in a command line of a driver that instructs the linking tool to generate the managed code. In such manner, a developer may select a name for the managed code class during compilation. However, in other embodiments a default name may be given to the managed code. In some embodiments, all of the generated managed code may be written into a temporary file (such as a C++ file (i.e., a .CPP file)).

Next, the managed code generated above may be compiled into a managed object file. In various embodiments, the compiler may be a compiler supporting managed C++, such as a C/C++ compiler of Microsoft Visual Studio 7, with the common language runtime (CLR) switch enabled.

The result of the compilation of the managed code may be another object file, which includes intermediate language code and metadata. For example, in one embodiment the intermediate language code may be MSIL code. The example managed code of Table 4 may be compiled into a managed routine entitled class_name::bar, that includes MSIL instructions of mapping parameters and a call to the native routine entitled ::bar. In some embodiments, this invocation from the managed code to the unmanaged code may implement an It Just Works (IJW) mechanism. This is the point at which the native code is connected to the managed code.

Referring now to Table 5, shown is example intermediate language code compiled from the example managed code of Table 4.

TABLE 5

IL_0000:   ldarg.0
IL_0001:   ldarg.1
IL_0002:   call int32
modopt ( [mscorlib] System.Runtime.CompilerServices.CallConvCdecl)
bar (float64, int32)
IL_0007:   ret The code of Table 5 may effect data marshalling and implement compiled managed code to call the native code function "bar". While shown in Table 5 as MSIL code, in other embodiments intermediate code of JAVA™ or another managed environment may be implemented.

Finally, a single assembly DLL may be generated. Specifically, a linking tool may be used to link the object files generated from the native code and the object files generated from the emitted managed code. The result is a single assembly DLL, inside of which is a native implementation of the methods and the intermediate code and metadata to export these methods in the form of class_name::method_name. These exported methods are all static methods, so that a user program can invoke the methods directly without creating objects.

Using the resulting assembly, a program written in a managed environment (e.g., any .NET or JAVA™ program) may access the native methods by importing the assembly. Referring now to Table 6, shown is an example code segment of a program in a managed language to import the assembly generated above.

TABLE 6 value = class_name.bar ( 1.0, 2 );

Because the implementation of the function "bar" is native code, it may bring significant performance gain to the program, as the native code may be optimized for underlying platform hardware. This is particularly so if there are computation-intensive operations within the routine itself.

Embodiments may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions.

Figure 4:
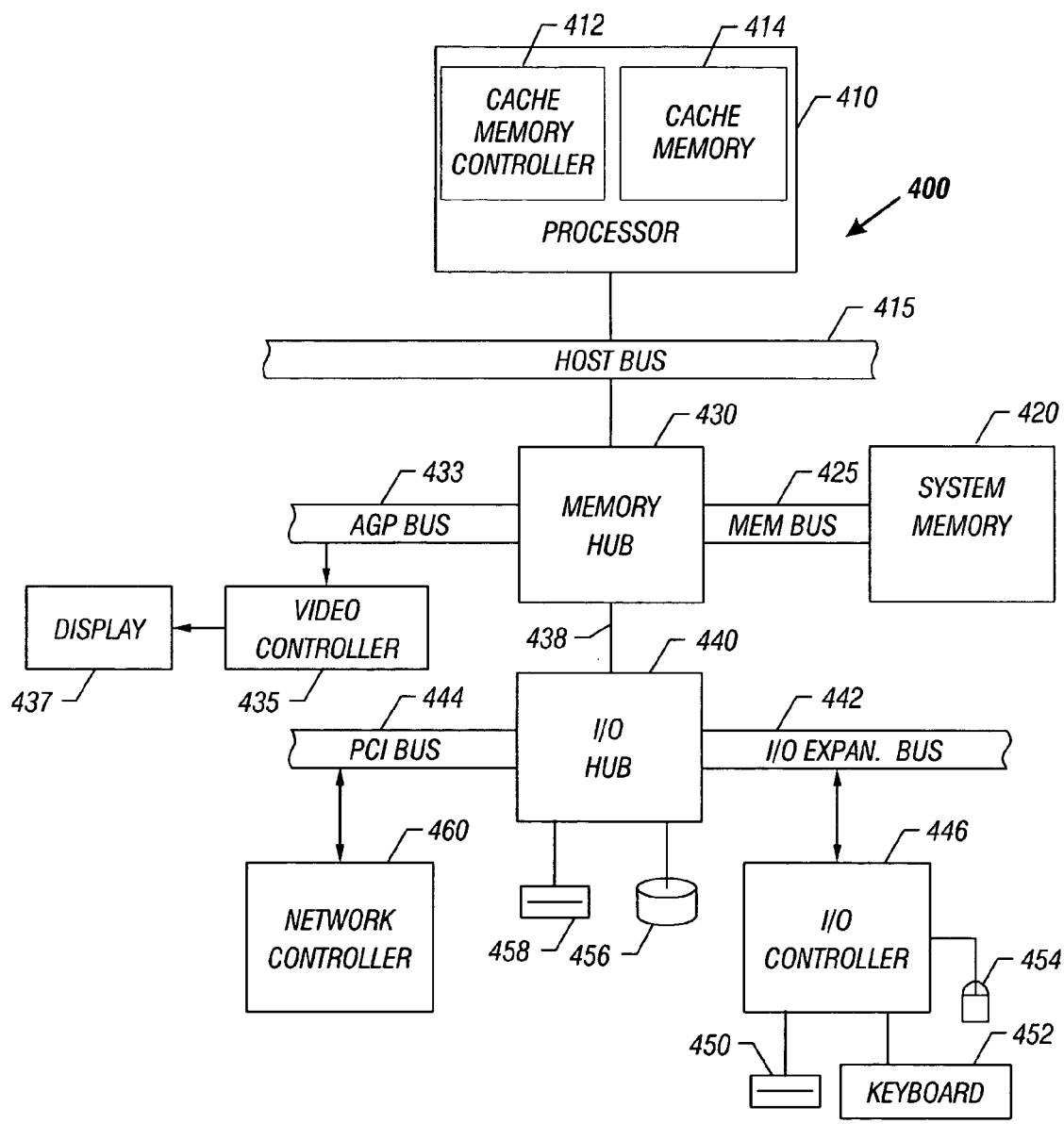
FIG. 4 is a block diagram of a computer system with which embodiments of the invention may be used.

Example embodiments may be implemented in software for execution by a suitable computer system configured with a suitable combination of hardware devices. FIG. 4 is a block diagram of a computer system 400 with which embodiments of the invention may be used. As used herein, the term "computer system" may refer to any type of processor-based system, such as a notebook computer, a server computer, a laptop computer, or the like.

Now referring to FIG. 4, in one embodiment computer system 400 includes a processor 410, which may include a general-purpose or special-purpose processor such as a microprocessor, microcontroller, a programmable gate array (PGA), and the like. Processor 410 may include a cache memory controller 412 and a cache memory 414. Processor 410 may be coupled over a host bus 415 to a memory hub 430 in one embodiment, which may be coupled to a system memory 420 (e.g., a dynamic RAM) via a memory bus 425. Memory hub 430 may also be coupled over an Advanced Graphics Port (AGP) bus 433 to a video controller 435, which may be coupled to a display 437. AGP bus 433 may conform to the Accelerated Graphics Port Interface Specification, Revision 2.0, published May 4, 1998, by Intel Corporation, Santa Clara, Calif.

Memory hub 430 may also be coupled (via a hub link 438) to an input/output (I/O) hub 440 that is coupled to an input/output (I/O) expansion bus 442 and a Peripheral Component Interconnect (PCI) bus 444, as defined by the PCI Local Bus Specification, Production Version, Revision 2.1 dated June 1995. I/O expansion bus 442 may be coupled to an I/O controller 446 that controls access to one or more I/O devices. As shown in FIG. 4, these devices may include in one embodiment storage devices, such as a floppy disk drive 450 and input devices, such as a keyboard 452 and a mouse 454. I/O hub 440 may also be coupled to, for example, a hard disk drive 456 and a compact disc (CD) drive 458, as shown in FIG. 4. It is to be understood that other storage media may also be included in the system.

PCI bus 444 may also be coupled to various components including, for example, a network controller 460 that is coupled to a network port (not shown). Additional devices may be coupled to the I/O expansion bus 442 and the PCI bus 444, such as an input/output control circuit coupled to a parallel port, serial port, a non-volatile memory, and the like.

Although the description makes reference to specific components of system 400, it is contemplated that numerous modifications and variations of the described and illustrated embodiments may be possible. Further, in other embodiments instead of a shared bus system, a point-to-point bus system, such as a common system interface (CSI) architecture may be implemented.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   forming, using a compiler, an object file corresponding to a native code module optimized for an underlying platform hardware, the object file including prototype information including metadata corresponding to the native code module to describe functions and parameters to be used during execution of the object file;
   automatically generating, using the compiler, a managed code wrapper using the prototype information extracted from the object file using a linking tool;
   creating a single assembly including the managed code wrapper and the native code module, the single assembly generated as a combined library that can be reused by native, code and managed code, and corresponding to a collection of types and resources that work together and form a logical functional unit; and
   importing the single assembly into a program in a managed runtime environment to perform a function on the underlying platform hardware.

2. The method of claim 1, further comprising using the single assembly to bridge a gap between the managed runtime environment and the underlying platform hardware.

3. The method of claim 1, further comprising importing the single assembly into a native code environment.

4. The method of claim 1, further comprising passing parameters from the managed runtime environment to the native code module using the managed code wrapper.

5. The method of claim 1, wherein creating the single assembly comprises creating a dynamically linked library.

6. An apparatus comprising a machine-accessible storage medium:
   a single managed assembly including:
      native object code to perform at least one function, wherein a compiler is to compile a native code portion to obtain the native object code and to extract prototype information from the native code portion using a linking tool, the prototype information including metadata corresponding to the native code portion, to describe functions and parameters to be used during execution of the native object code.; and managed object code to provide an interface between the native object code and a managed environment, wherein the compiler is to compile managed wrap code to obtain the managed object code, wherein the single managed assembly is accessible in the managed environment and in a native code environment, and corresponding to a collection of types and resources that work together and form a logical functional unit.

7. The apparatus of claim 6, wherein the managed object code is automatically generated from prototype information extracted from the native object code.

8. The apparatus of claim 6, further comprising first code to cause the compiler to compile the native code portion.

9. The apparatus of claim 8, further comprising second code to cause the compiler to emit the native object code based on the prototype information.

10. The apparatus of claim 9, further comprising third code to cause the compiler to compile the managed wrap code to obtain the managed object code.

11. The apparatus of claim 6, wherein the single managed assembly comprises a dynamically linked library and the native object code comprises a platform-optimized legacy library.

12. An article comprising a machine-accessible storage medium containing instructions that if executed enable a system to:

compile a native code module into a native object tile including prototype information that includes metadata corresponding to the native code module to describe functions and parameters to be used during execution of the native object filet using a compiler;

extract the prototype information from the native object file using a linking tool;

automatically generate a managed code interface for the native object file according to the prototype information using the compiler; and create a single assembly including the managed code interface and the native object file, the single assembly generated as a combined library that can be reused by native code and managed code, and corresponding to a collection of types and resources that work together and form a logical functional unit.

13. The article of claim 12, further comprising instructions that if executed enable the system to import the single assembly into a managed runtime environment.

14. The article of claim 12, further comprising instructions that if executed enable the system to compile the managed code interface into a managed object interface and to link the managed object interface and the native object code.

15. A system comprising:

a processor;

a storage coupled to the processor including instructions that if executed enable the system to compile a native code module into a native object file including prototype information that includes metadata, corresponding to the native code module to describe functions and parameters to be used during execution of the native object file; to extract the prototype information from the native object file using a linking tool; using a compiler, automatically generate a managed code interface for the native object file according to the prototype information using the compiler, and create a single assembly including the managed code interface and the native object file, the single assembly generated as a combined library that can be roused by native code and managed code, and corresponding to a collection of types and resources that work together and form a logical functional unit; and a dynamic random access memory coupled to the processor.

16. The system of claim 15, wherein the native code module is optimized for the processor.

17. The system of claim 15, wherein the single assembly to bridge a gap between a managed environment and the processor.

18. The system of claim 15, wherein the compiler is to emit the native code module according to the prototype information.

19. The system of claim 18, further comprising a linker to extract the prototype information and to automatically generate the managed code interface.

20. The system of claim 19, wherein the compiler to compile the managed code interface.

* * * * *

UNITED STATES PATENT AND TRADEMARK OFFICE
CERTIFICATE OF CORRECTION

PATENT NO.        : 7,472,375 B2
APPLICATION NO.   : 11/092355
DATED             : December 30, 2008
INVENTOR(S)       : Jinyun Ye et al.

It is certified that error appears in the above-identified patent and that said Letters Patent is hereby corrected as shown below:

Col. 8:
Line 43, "native, code" should be --native code--;
Line 67, "portion, to" should be --portion to--;

Col. 9:
Line 2, "code.; and" should be --code; and--;
Line 32, "tile" should be --file--;
Line 36, "filer" should be --file,--;

Col. 10:
Line 26, "roused" should be --reused--.

Signed and Sealed this
Twenty-third Day of October, 2012

David J. Kappos
*Director of the United States Patent and Trademark Office*